US011200272B2

(12) United States Patent
Rönnäng et al.

(10) Patent No.: US 11,200,272 B2
(45) Date of Patent: Dec. 14, 2021

(54) DYNAMIC PLAYLIST PRIORITY IN A VEHICLE BASED UPON USER PREFERENCES AND CONTEXT

(71) Applicant: Volvo Car Corporation, Gothenburg (SE)

(72) Inventors: Magnus Rönnäng, Västra Frölunda (SE); Staffan Davidsson, Västra Frölunda (SE)

(73) Assignee: VOLVO CAR CORPORATION, Gothenburg (SE)

( * ) Notice: Subject to any disclaimer, the term of this patent is extended or adjusted under 35 U.S.C. 154(b) by 28 days.

(21) Appl. No.: 16/369,227

(22) Filed: Mar. 29, 2019

(65) Prior Publication Data

US 2020/0311119 A1 Oct. 1, 2020

(51) Int. Cl.
| | |
|---|---|
| *G06F 16/45* | (2019.01) |
| *H04L 29/06* | (2006.01) |
| *H04L 29/08* | (2006.01) |
| *G06F 3/0482* | (2013.01) |

(52) U.S. Cl.
CPC ............ *G06F 16/45* (2019.01); *G06F 3/0482* (2013.01); *H04L 67/12* (2013.01); *H04L 67/22* (2013.01); *H04L 67/38* (2013.01)

(58) Field of Classification Search
CPC ....... G06F 16/45; G06F 3/0482; H04L 67/12; H04L 67/22; H04L 67/38
See application file for complete search history.

(56) References Cited

U.S. PATENT DOCUMENTS

| | | |
|---|---|---|
| 8,121,784 B2 | 2/2012 | Templeton et al. |
| 9,088,572 B2 | 7/2015 | Ricci |
| 9,390,757 B2 | 7/2016 | Shahraray et al. |

(Continued)

FOREIGN PATENT DOCUMENTS

CN 104813680 7/2015

OTHER PUBLICATIONS

Non-Final Office Action received for U.S. Appl. No. 16/369,606 dated Sep. 7, 2021, 25 pages.

(Continued)

*Primary Examiner* — Seth A Silverman
(74) *Attorney, Agent, or Firm* — Amin, Turocy & Watson, LLP

(57) ABSTRACT

Systems, methods and computer program products that facilitate dynamic playlist priority in a vehicle based upon user preferences and context. According to an embodiment, a system comprises a processor that executes computer executable components stored in at least one memory, a compilation component that receives content in a vehicle, an assessment component that respectively classifies subsets of the content, a ranking component that ranks relevancy of the classified subsets of content based upon preferences and context of a user in the vehicle, a content playback component that plays the subsets of classified content based upon relevancy ranking, a prioritization component that dynamically prioritizes a first subset of the content based upon the context of the user or context of a sender of the first subset of content, wherein the first subset of content comprises extrinsic data, and an interrupt component that interrupts playback of the subsets of classified content based upon the dynamic prioritization.

21 Claims, 8 Drawing Sheets

(56) References Cited

U.S. PATENT DOCUMENTS

| | | | |
|---|---|---|---|
| 9,798,509 B2 | 10/2017 | Panguluri et al. | |
| 9,956,876 B2 | 5/2018 | Wu et al. | |
| 10,067,988 B2 | 9/2018 | Choksi et al. | |
| 2005/0172230 A1* | 8/2005 | Burk | B60K 35/00 |
| | | | 715/716 |
| 2010/0184005 A1 | 7/2010 | Eklund et al. | |
| 2010/0274410 A1 | 10/2010 | Tsien et al. | |
| 2011/0099519 A1* | 4/2011 | Ma | H04N 21/4668 |
| | | | 715/811 |
| 2013/0091054 A1* | 4/2013 | Nathan | H04N 21/4758 |
| | | | 705/39 |
| 2013/0132172 A1 | 5/2013 | Liu et al. | |
| 2014/0188920 A1* | 7/2014 | Sharma | G06F 16/635 |
| | | | 707/758 |
| 2015/0030998 A1 | 1/2015 | Liu et al. | |
| 2015/0074022 A1* | 3/2015 | Cornelius | G06F 16/435 |
| | | | 706/12 |
| 2015/0127818 A1* | 5/2015 | Bates | G06F 16/639 |
| | | | 709/224 |
| 2018/0188054 A1 | 7/2018 | Kennedy et al. | |
| 2018/0357233 A1 | 12/2018 | Daze et al. | |
| 2020/0311119 A1 | 10/2020 | Rönnäng et al. | |

OTHER PUBLICATIONS

Non-Final Office Action received for U.S. Appl. No. 16/369,606 dated Oct. 20, 2021, 13 pages.
Non-Final Office Action received for U.S. Appl. No. 16/369,606 dated Oct. 8, 2021, 74 pages.

* cited by examiner

DYNAMIC PLAYLIST PRIORITY IN A VEHICLE BASED UPON USER PREFERENCES AND CONTEXT

TECHNICAL FIELD

Embodiments disclosed and claimed herein relate to techniques that facilitate dynamic playlist priority in a vehicle based upon user preferences and context.

BACKGROUND

Users in vehicles have access to a wide variety of content through entertainment and communication systems in vehicles or electronic devices brought into vehicles. For example, users with access to a smartphone, smartwatch, tablet or other external user device that can sync with a vehicle's entertainment and communication systems can access a wide variety of broadcast, streaming or stored content, such as local radio, satellite radio, streaming radio, stored music, podcasts, audiobooks, voice messages, instant messages or email. Yet having access to so many content options from different sources can make it difficult for users in a vehicle to access preferred content choices. For example, some content may be easily accessible using a vehicle's controls or by using voice commands, while accessing other content may require additional steps using the vehicle's controls or using applications on an external user device. Such difficulties are compounded if a user wants to consume different types of content sequentially or create a playlist from different content sources. This presents challenges for users who want to control their consumption of content in a vehicle, particularly when driving. This can further lead to more instances of distracted driving.

Conventional entertainment systems such as described in U.S. Pat. No. 10,108,619B2, CN104813680A, U.S. Pat. No. 10,067,988B2, US20140188920A1, and U.S. Pat. No. 9,088,572B2 describe standard playlists and coarse classification of content. However, these systems do not contemplate let alone address the nuances associated with focus of driver attention, ever-changing context of driver, vehicle and extrinsic factors that affect what is most important or relevant to a driver or passenger. Moreover, privacy implications and multi-modal factors as well as a multi-passenger environment with different user preferences and context are not addressed by the state of the art.

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments described herein, systems, computer-implemented methods, apparatus and/or computer program products are presented that facilitate dynamic playlist priority in a vehicle based upon user preferences and context.

According to one or more embodiments, a system comprises techniques that facilitate dynamic playlist priority in a vehicle based upon user preferences and context that are prioritized in real time. The system can comprise a processor that executes computer executable components stored in at least one memory, a compilation component that receives content in a vehicle, an assessment component that respectively classifies subsets of the content, a ranking component that ranks relevancy of the classified subsets of content based upon preferences and context of a user in the vehicle, a content playback component that plays the subsets of classified content based upon relevancy ranking, a prioritization component that dynamically prioritizes a first subset of the content based upon the context of the user or context of a sender of the first subset of content, wherein the first subset of content comprises extrinsic data, and an interrupt component that interrupts playback of the subsets of classified content based upon the dynamic prioritization.

In some embodiments, elements described in connection with the disclosed systems can be embodied in different forms such as a computer-implemented method, a computer program product, or another form.

DETAILED DESCRIPTION

The following detailed description is merely illustrative and is not intended to limit embodiments and/or application or uses of embodiments. Furthermore, there is no intention to be bound by any expressed or implied information presented in the preceding Summary section or in the Detailed Description section.

Embodiments described herein include systems, methods, and computer program products that facilitate dynamic playlist priority in a vehicle based upon user preferences and context. In many instances, the ability to access a playlist that prioritizes and plays content for users in a vehicle will significantly reduce the need to search for and select content using a vehicle's controls or applications on an external user device, which reduces distracted driving. Also, by pushing content to a user through a playlist based upon the user's preferences and context, the user will have the opportunity to consume preferred content that the user may have otherwise missed had the user been required to search for and select the content using a vehicle's controls or applications on an external user device.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
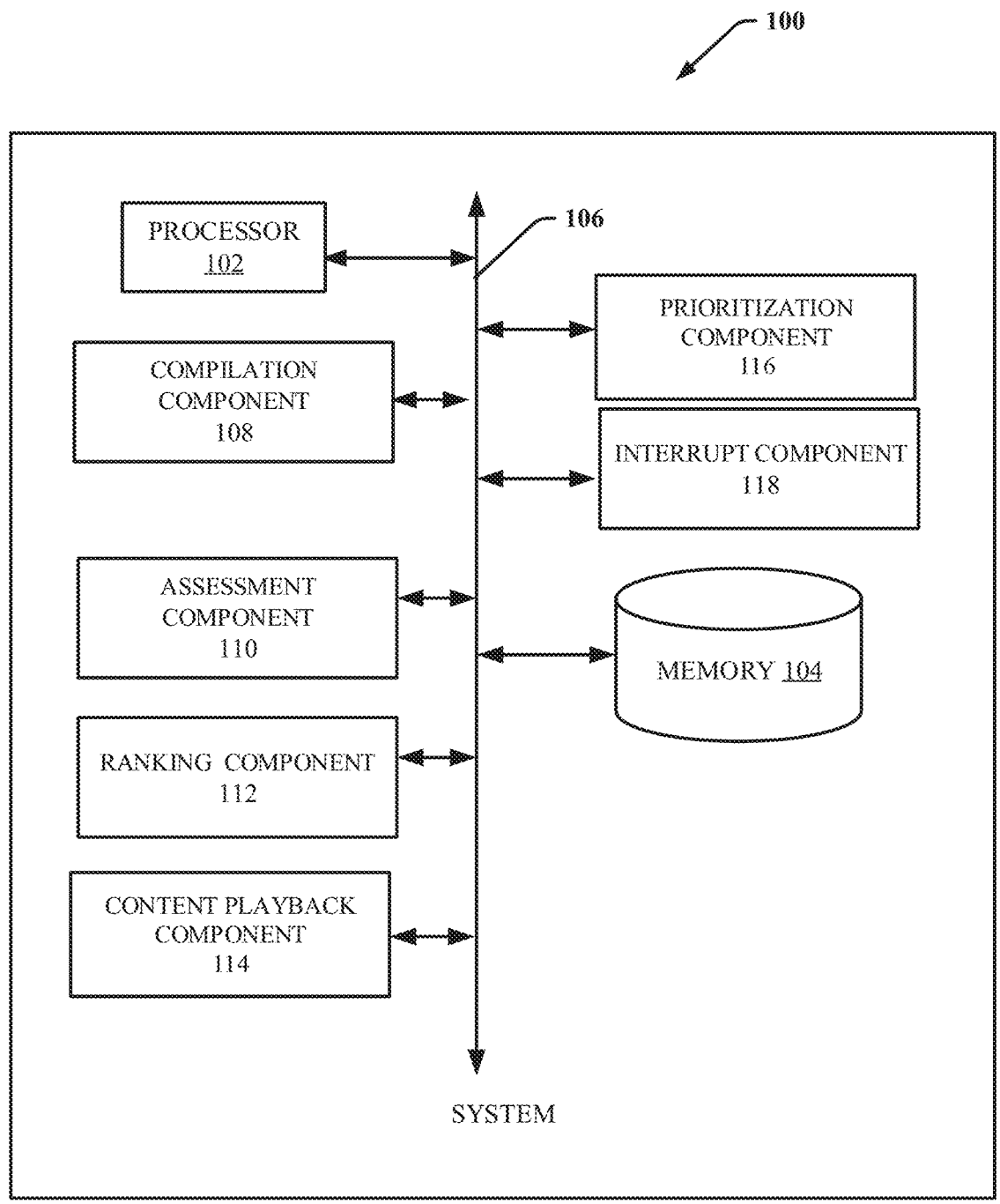
FIG. 1 illustrates a block diagram of an example, non-limiting system that facilitates dynamic playlist priority in a vehicle based upon user preferences and context in accordance with one or more embodiments described herein.

Turning now to the drawings, FIG. 1 illustrates a block diagram of an example, non-limiting system 100 that facilitates dynamic playlist priority in a vehicle based upon user preferences and context in accordance with one or more embodiments described herein. The system includes a processor 102 that executes computer executable components stored in at least one memory 104. The system 100 can further include a system bus 106 that can couple various components, including, but not limited to, a compilation component 108, an assessment component 110, a ranking component 112, a content playback component 114, a prioritization component 116 and an interrupt component 118. The compilation component 108 receives content in a vehicle. The assessment component 110 assesses and respectively classifies subsets of the content. The ranking component 112 ranks relevancy of classified subsets of content based upon preferences and context of a user in the vehicle. The content playback component 114 plays the subsets of classified content as a playlist in an order based upon relevancy ranking determined by the ranking component 112. The prioritization component 116 dynamically prioritizes a first subset of the content based upon context of the user or context of a sender of the first subset of content, wherein the first subset of content comprises extrinsic data. For example, such extrinsic data can include: an email, an instant message, news alert, phone call, weather alert, traffic alert, proximity alert, government emergency alert, Amber alert, construction alert, social network alert, or the like. The interrupt component 118 interrupts playback of the subsets of classified content based upon the dynamic prioritization.

In certain embodiments, the memory 104 used to store content received by the compilation component 110 can be contained in at least one of a vehicle, a cloud computing system or an external user device.

In certain embodiments, the compilation component 108 can receive content such as audio files or content convertible into audio files along with metadata relating to the content. Such content and related metadata can be received from one or more broadcast, streaming or stored content sources, such as local radio, satellite radio, streaming radio, music stored on an external user device, podcasts, audiobooks, voice messages, instant messages or email. Metadata can include a wide variety of information relating to a particular content file, portions of a content file or sets and subsets of related content files. One example includes descriptive metadata such as an abstract, a title or subtitle, keywords or hashtags taken directly from the content source, or user comments or ratings from a source such as a social media platform. Another example can include transcript(s) of certain audio files such as for example news reports. With respect to music, examples can include genre, song title, artist, album, songwriter and release date.

In certain embodiments, the compilation component 108 records and stores broadcast or streaming content based upon preferences of a user. For example, a user may want all content produced by a particular talk show over the past week or other time period available for possible inclusion in a playlist. A user may also desire all segments from a variety of shows or other content sources that relate to a specific topic or include certain individuals be available for possible inclusion in a playlist.

In certain embodiments, the assessment component 110 can classify subsets of the content and related metadata received by the compilation component 108 based upon a variety of attributes. Certain attributes can be broadly defined, such as music versus talk radio or podcasts and sports versus politics. Others can be more narrowly defined such as political news versus political opinion or debate or even more specific categories such as political perspective. For example, in the sports genre, relevant attributes can include items such as type of sport, team, city, state, region, country, conference, players and coaches. Other attributes can include shows or individuals who provide sports analysis and opinion. The assessment component 110 can utilize a variety of methods to classify the subsets of content. For example, a rules-based classification system can rely first on title, subtitles and descriptive metadata with respect to certain content, such as a "health care debate" or "World Cup predictions," but absent such titles, subtitles or descriptive metadata can then rely upon machine learning technology to identify specific content attributes such as subject matter based upon the transcript for such content or comments related to such content in social media.

In another example, the assessment component 110 can be customized to enable a user to selectively modify or create one or more attributes used to classify one or more categories of content. For example, a user may prefer a particular talk show, but only with respect to one or more regular segments of that show. Another user may prefer that talk show, but only when a particular guest is on the show or a particular topic is being discussed. Because two users may want to assign different attributes when classifying content such as a talk show, the assessment component 110 can be modified depending on the preferences of the user using the dynamic playlist priority system 106. This enables a user to create attributes tailored to that user that enable the assessment component 110 to better assess and categorize content in a manner best tailored to the preferences of that user.

In certain embodiments, the ranking component 112 can rank relevancy of the subsets of content classified by the assessment component 110 based upon preferences and context of a user in the vehicle. In one example, a user can rank or exclude content based upon one or more attributes utilized by the assessment component 110 to classify content. Rankings can also be dependent on one or more attributes. For example, a user may only want to consume news content from a particular network if one or more anchors, analysts or guests ranked highly by the user are included in a particular content segment.

In another example, the ranking component 112 can determine preferences of a user through a questionnaire to be completed by the user and through subsequent questionnaires at time intervals that can be selected by the user. Questionnaires can be used to determine a user's preferences to various types of content and how such user preferences will vary depending on context. The ranking component 112 can also enable a user to indicate or modify preferences at any time. For example, a user may decide to express a stronger preference for certain types of content in anticipation of upcoming events such as playoffs in a particular sport or political elections. A user may also decide to express less of a preference for certain types of content after losing interest in one or more items in a recent playlist.

In another example, a user can select how the user's content preferences will vary based upon context. A user may decide that on the user's daily commute to work that the ranking component 112 will rank news, sports and important work-related emails over other content types, while on the user's commute home from work the ranking component 112 will rank a favorite podcast and instant messages from family and friends over other content types. For daily driving around town the user may instruct the ranking component 112 to rank certain music genres and all instant messages higher while longer trips entered into the vehicle's navigation system will cause the ranking component 112 to rank a certain audiobook and instant messages from select senders higher. In another example, a user's preferences with respect to certain content may vary depending on the time of year. A user many decide that content relating to a specific sport should be excluded from playlists in the offseason unless it involves breaking news for the local team, should be included in playlists during the season and should be given the highest ranking during the postseason. In another example, a user can indicate a preference against any news or commentary regarding political elections until three months prior to and one week following an election.

In certain embodiments, the content playback component 114 plays the subsets of classified content based upon the relevancy ranking generated by the ranking component 112. The content playback component 114 can play content utilizing the speaker system of a vehicle or an external user device. In one example, with respect to content received by the compilation component 108 as text files as opposed to audio files, the playback component 114 will utilize a text to speech component to play the content.

In certain embodiments, the prioritization component 116 can dynamically prioritizes a first subset of the content based upon the context of the user or context of a sender of the first subset of content, wherein the first subset of content comprises extrinsic data. For example, such extrinsic data can include an email, an instant message, news alert, phone call, weather alert, traffic alert or proximity alert, government emergency alert, Amber alert, construction alert, social network alert, or the like.

Once the ranking component 112 creates a playlist for a user in a vehicle, the prioritization component 116 can alter the playlist in real time based upon the context of the situation. For example, a user can identify the types of situations that might alter the user's preferences in real time. In one example, a user can specify in circumstances of intense weather that the prioritization component 116 will prioritize local weather reports from a specific source and in circumstances of high traffic that the prioritization component will prioritize traffic reports and alternate routes from all available sources.

In another example, the context of the sender of content can cause the prioritization component 116 to alter the playlist. For example, a user may prefer to have certain work-related emails and instant messages from colleagues and clients read to the user during the user's drive to work in the morning but not on the way home. Also, the user may prefer to not have instant messages from family and friends read to the user during the user's drive to work in the morning but prefers to hear them on the way home. But these preferences can be altered based upon the context of the sender. If a user's spouse is traveling out of town, a user may prefer that any emails or texts sent by the spouse while out of town be prioritized regardless of when sent. Similar examples can include a friend of colleague recovering from an illness in a hospital or a sick child at home instead of at school.

In certain embodiments, the interrupt component 118 interrupts playback of the subsets of classified content based on the dynamic prioritization by the prioritization component 116. While the prioritization component 116 will dynamically prioritize a content playlist in real time, a user can indicate preferences regarding types of content associated with extrinsic data that warrant interrupting the playlist as opposed to being included in the playlist after other content is played. For example, a user may decide that an instant message or email from a spouse who is traveling should be prioritized by the prioritization component 116 and thus included in a playlist in real time, but the user may also decide that a phone call, instant message or email from a spouse that originates from a hospital should result in an interruption by the interrupt component 118. In another example, a user may decide that an email from a colleague or client marked important should be prioritized by the prioritization component 116 and thus included in a playlist in real time, but the user may also decide that an email from a colleague or client marked important on a day that a meeting is scheduled with that colleague or client should result in an interruption by the interrupt component 118. In another example, a user can indicate a preference that if a spouse, child, colleague or client makes at least three attempts to reach a user through a phone call, instant message or email within a short period of time, thus indicating a potentially important message, interrupt component 118 should interrupt a playlist. In another example, a user can indicate a preference that a weather alert should result in an interruption by the interrupt component 118 only during winter month or if the extrinsic data is associated with a weather emergency. In another example, a user can indicate a preference that a proximity alert for a gas station should result in an interruption by the interrupt component 118 only when the available fuel level in the vehicle is below a specified level.

In another example, the interrupt component 118 provides different types of interruption based on a user's preference. A user can choose to have certain content associated with extrinsic data identified by the prioritization component 116 immediately played in full, while other content associated with extrinsic data identified by the prioritization component 116 will only generate an alert that important content has been received and can be accessed and played in full at the option of the user. For example, a user may prefer that any content from the user's spouse or children identified by the prioritization component 116 should be immediately accessed in full by the interrupt component 118, while any content from the user's colleagues or clients identified by the prioritization component 116 should only generate an alert by the interrupt component 118 that important content has been received and can be accessed.

Figure 2:
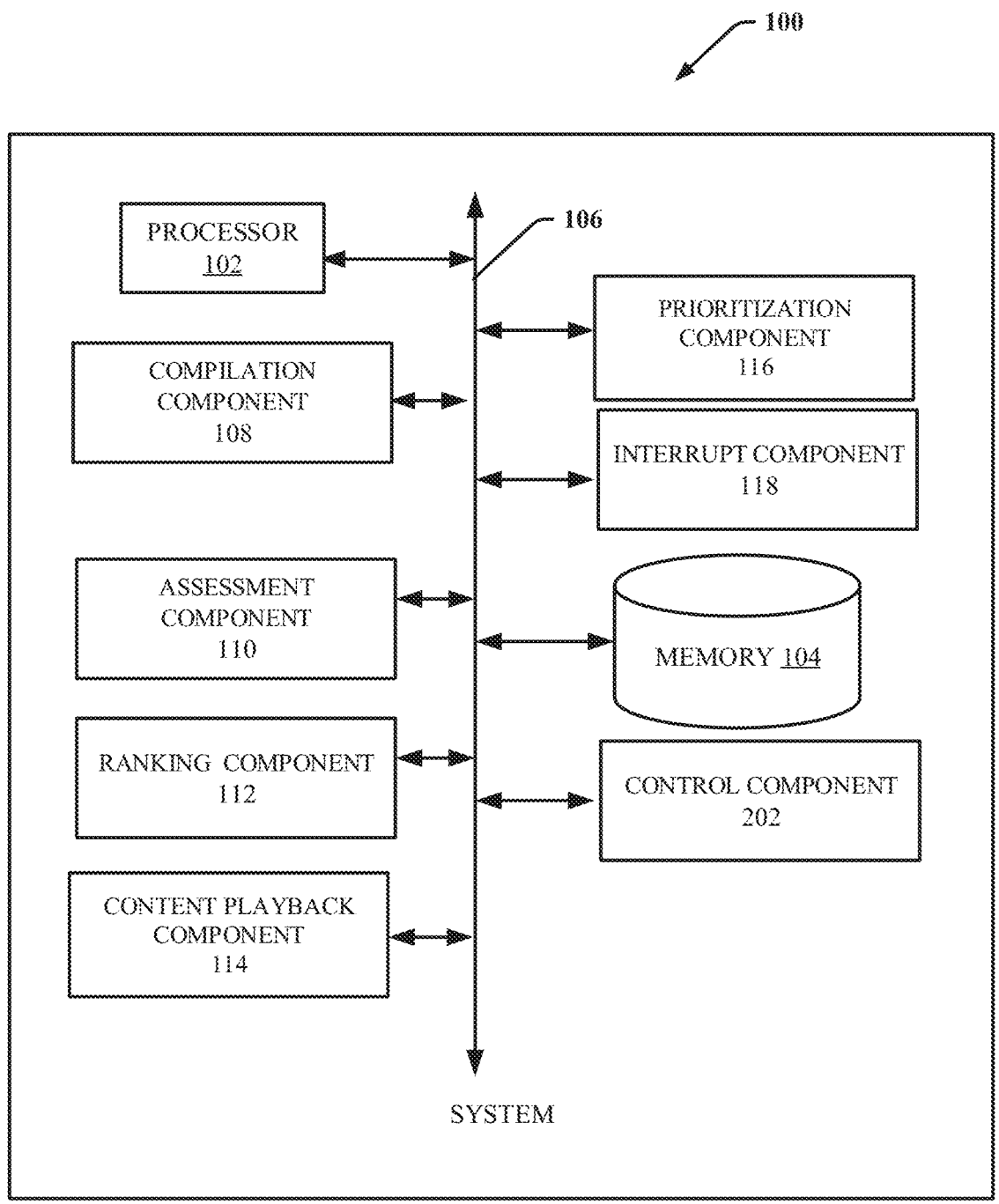
FIG. 2 illustrates a block diagram of another example, non-limiting system that facilitates dynamic playlist priority in a vehicle based upon user preferences and context in accordance with one or more embodiments described herein.

FIG. 2 illustrates a block diagram of another example, non-limiting system that facilitates dynamic playlist priority in a vehicle based upon user preferences and context in accordance with one or more embodiments described herein. Repetitive description of like elements employed in respective embodiments is omitted for sake of brevity. In certain embodiments, the system 200 includes control component 202 that enables a user to select specific content or create customized rankings with respect to the planned use of a vehicle for a specified time period. For example, a user planning a long drive may select a series of podcasts for that trip. In the aftermath of a significant news story, a user can indicate a preference to only hear news reports and commentary regarding that news story for the next day. This control component can thus be used to tailor playlists to the preferences of a user with respect to a particular situation. In another example, the control component 202 can be utilized using a vehicle's controls or through use of an external user device. For example, a user can skip content or make content selections from a playlist using controls on the center stack of a dashboard or on the steering wheel or by using a vehicle's voice-enabled controls.

Figure 3:
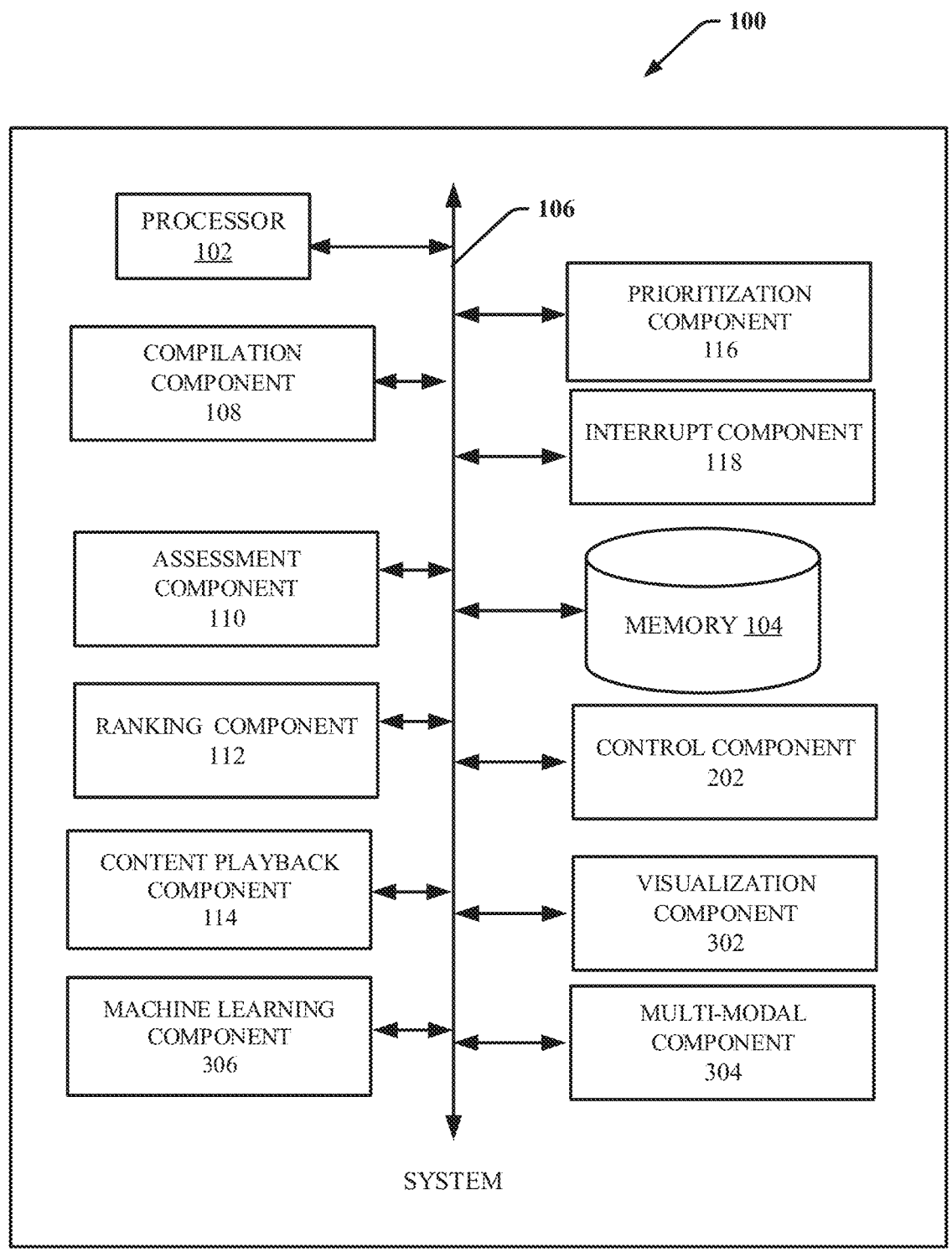
FIG. 3 illustrates a block diagram of another example, non-limiting system that facilitates dynamic playlist priority in a vehicle based upon user preferences and context in accordance with one or more embodiments described herein.

FIG. 3 illustrates a block diagram of another example, non-limiting system that facilitates dynamic playlist priority in a vehicle based upon user preferences and context in accordance with one or more embodiments described herein. In certain embodiments, the system 300 includes visualization component 302 that displays, summarizes and organizes a playlist in accordance with one or more embodiments described herein. In one example, the visualization component can consist of a touchscreen in the center stack of a vehicle that displays a graphical user interface (GUI) comprising touch controls to control functions of the vehicle. The visualization component 302 can provide a variety of screen displays available to a user depending how much information regarding a playlist and related metadata a user selects to have displayed. For example, the visualization component 302 can display detailed information regarding the content item currently being played by the content playback component 114 along with the title of next content item on the playlist, or the visualization component can list the currently played content item and some number of upcoming content items on the playlist in order to provide a user more control regarding skipping past playlist content items. In another example, the manner in which playlists and related metadata are displayed can depend on the type of content included in a playlist or the context. For example, a user can specify that any playlists including music or items such as emails or instant messages be listed with detailed metadata in a list format displaying upcoming content items. Also, for safety reasons, such listing displays can revert to only displaying the content item currently being played by the content playback component 114 along with the title of next content item on the playlist whenever the vehicle is traveling above a certain speed in order to cause less distraction for the driver. In another example, a playlist and related metadata can be displayed as one of the options on a windshield display immediately in front of the driver or on an external user device used by a passenger in the vehicle.

In certain embodiments, the system 300 includes multi-modal component 304 that transfers playback of the subsets of classified content from a first device to a second device in accordance with one or more embodiments described herein.

In certain embodiments, the system 300 includes machine learning component 306 enabling the ranking component 112 or prioritization component 116 to utilize artificial intelligence and machine learning to learn the behavior of a user with respect to playback of content in various contexts, and update the relevancy ranking generated by the ranking component 112 and the dynamic prioritization generated by the prioritization component 116 based upon the learned user behavior. For example, a user may consistently skip work email from several colleagues on the way to work even after expressing a preference to receive work emails on the user's daily commute to work. In another example, a user may consistently skip news programs regarding a specific story even though the general topic is preferred by the users.

This and other behavior by a user can be used by the machine learning component 306 to modify and improve the relevancy of playlists generated by the ranking component 112 and the dynamic prioritization generated by the prioritization component 116 depending on the context. In another example, user behavior can be used by the machine learning component 306 to supplement or modify questions in subsequent questionnaires used to train the ranking component 112 and the prioritization component 116 in order confirm or adjust new relevancy rankings generated by the ranking component 112 or dynamic prioritizations generated by the prioritization component 116.

In another example, the machine learning component 306 can train the assessment component 110 to identify certain attributes used to classify content utilizing information provided by users of the system 300 who create or modify attributes used to classify one or more categories of content. For example, as more users select a particular attribute such as segment or guest to classify a talk show, the system 300 can apply those attributes more broadly to enable other users to indicate similar preferences. In another example, as new topics emerge in genres such as entertainment, politics and sports, the machine learning component 306 can train the assessment component 110 to identify such additional topics in the content and related metadata received by the compilation component 108 and create applicable attributes that can be used to classify such content.

Figure 4:
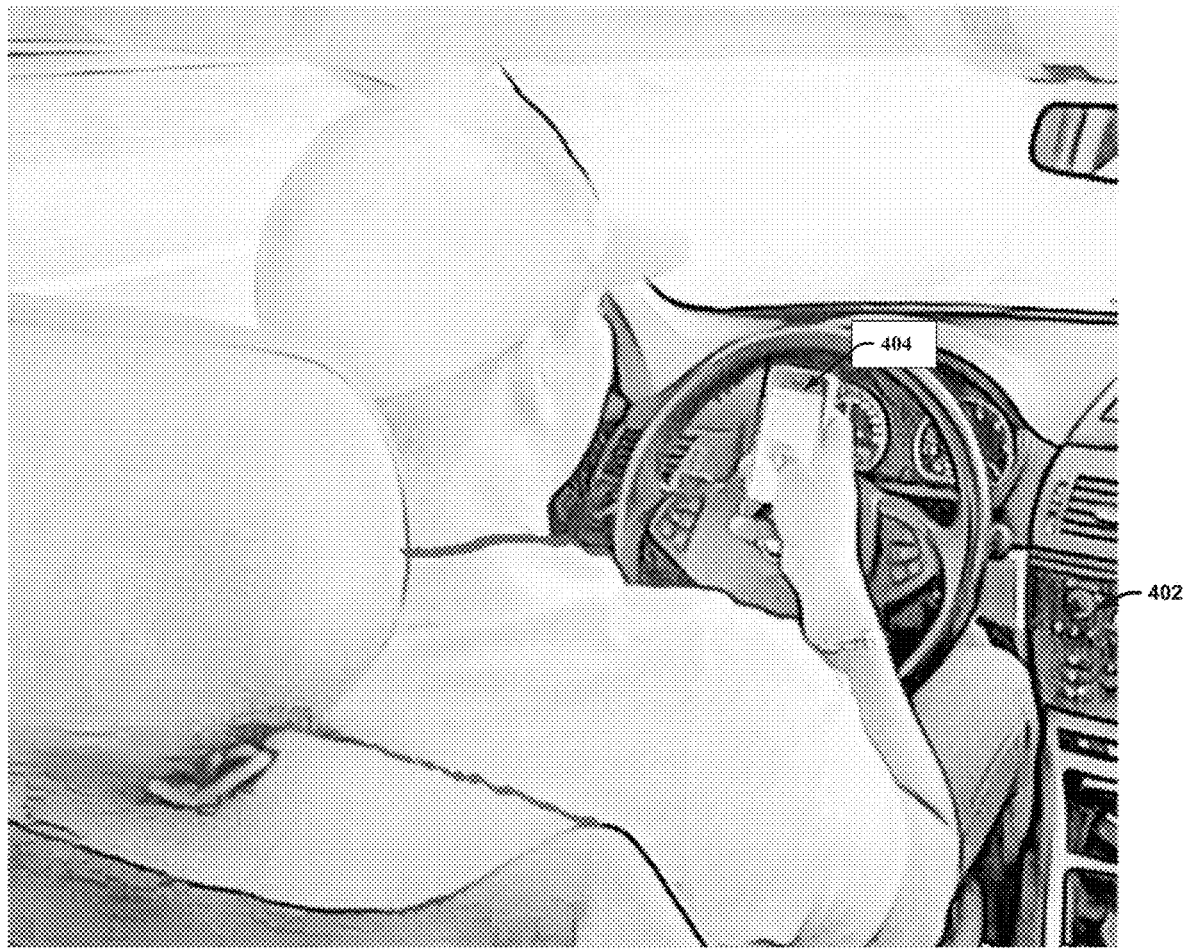
FIG. 4 illustrates yet another example of a non-limiting system that facilitates dynamic playlist priority in a vehicle and transfers the playback of the subsets of classified content from a first device to a second device in accordance with one or more embodiments described herein.

In this regard, the machine learning component 306 can perform classifications, correlations, inferences and/or expressions associated with principles of artificial intelligence. For instance, the machine learning component 306 can employ an automatic classification system and/or an automatic classification. In one example, the machine learning component 306 can employ a probabilistic and/or statistical-based analysis (e.g., factoring into the analysis utilities and costs) to learn and/or generate inferences. The machine learning component 306 can employ any suitable machine-learning based techniques, statistical-based techniques and/or probabilistic-based techniques. For example, the machine learning component 306 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the machine learning component 306 can perform a set of machine learning computations. For example, the machine learning component 306 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations. FIG. 4 illustrates yet another example of a non-limiting system that facilitates dynamic playlist priority in a vehicle and further comprises a multi-modal component that transfers playback of the subsets of classified content from a first device 402 to a second device 404 in accordance with one or more embodiments described herein. FIG. 4 depicts a view of the interior of a vehicle with a driver seated in the driver's seat and holding a smartphone 404. In this example, the playlist generated by the ranking component 112 in the vehicle that has been playing utilizing the content playback component 114 in the vehicle 402 is being transferred utilizing the multi-model component 304 to an application on the driver's smartphone 404 through which playback of the playlist can continue as driver exits the vehicle. In another example, the multi-modal component 304 transfers the playback of the subsets of classified content from a first device 402 to other external user devices. In one example, a user can elect to transfer the playback of a playlist to a smartphone 404 or other external user device before exiting the vehicle. A user can also elect to save the playlist in the cloud to access and play at another time. In another example, a user can select certain playlists, types of playlists or parts pf playlists that will automatically transfer to an external user device or the cloud. For example, a user may only want content related to music or news transferred to an external user device if the user elects to transfer such content as he is leaving a vehicle. In another example, a user may want all content in a playlist related to sports talk saved in the cloud to be accessed later at the user's discretion.

In another example, the multi-modal component 304 can enable a user's preferences to be transferred to another vehicle used by the user for playlist playback. Such other vehicle can access user's preferences by syncing with one of the user's external user devices or by enabling access to the user's preferences stored in the cloud.

Figure 5:
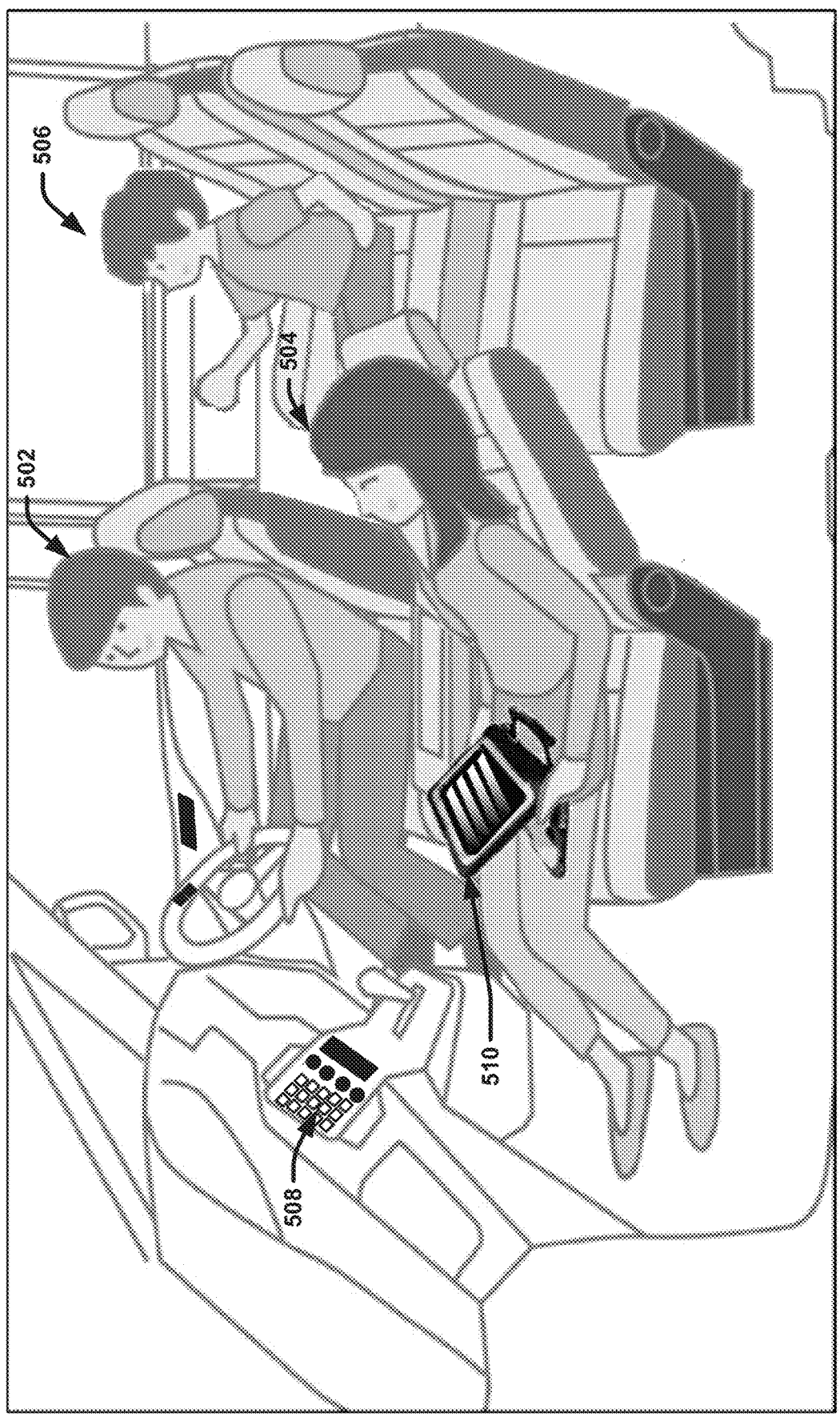
FIG. 5 illustrates yet another example of a non-limiting system that facilitates dynamic playlist priority in a vehicle based upon preferences and context of two or more individuals in the vehicle in accordance with one or more embodiments described herein.

FIG. 5 illustrates yet another example of a non-limiting system that facilitates dynamic playlist priority in a vehicle based upon preferences and context of two or more individuals in the vehicle in accordance with one or more embodiments described herein. In this example, the ranking component 112 ranks the relevancy of the classified subsets of content based upon preferences and context of two or more individuals in the vehicle. FIG. 5 depicts a view of the interior of vehicle with three people, including a driver 502 seated in the driver's seat, a first passenger 504 seated in the front passenger seat, and a second passenger 506 seated in a back seat of the vehicle behind the driver. In one example, the driver's playlist generated by the ranking component 112 is modified due to the presence of at least one passenger to remove all podcasts and audiobooks from the playlist. The vehicle can detect presence of other passengers using sensors and syncing with any external user devices that can identify individuals, and the ranking component 112 can also prompt the driver to confirm the presence and identity of other passengers. In one example, if a first passenger 504 is the driver's spouse and the second passenger 506 is the driver's son, the driver's playlist will exclude all emails and instant messages based on the preferences of the driver 502. In another example, if only the driver's spouse is in the vehicle as the first passenger 504, the driver's playlist will exclude all emails and instant messages and include news and music based on the preferences of the driver 502. In another example, if only the driver's son is in the vehicle as the first passenger 504, the driver's playlist will exclude all emails and instant messages and include sports and music based on the preferences of the driver 502. In another example, if the other passengers are individuals other that a user's family but are not identified by the ranking component, the driver's playlist will only include music based on the preferences of the driver 502. In another example, a privacy mode can be enabled when one or more additional passengers are in the vehicle causing all emails, instant messages and voice messages, or emails, instant messages and voice messages from certain senders or groups of senders, to be excluded from playlists or interruptions, or enabling a user to see emails, instant messages and voice messages included in a playlist by the ranking component 112 or the prioritization component 116 using the visualization component 118 so that the user can decide whether to have one or more of such emails, instant messages or voice messages played in the presence of the passengers.

In another example, user profiles can be created for frequent passengers in a primary user's vehicle such as family members, friends and colleagues and clients. This enables a user to further tailor the user's content preferences depending on the identify of more passengers. For example, a user may have friends that share a passion for a particular sport or activity and can thus indicate preferences that only content consisting of news, talk shows or podcasts relating to that sport or activity be included in playlists when one or more of those friends are passengers.

In another example, the preferences of at least one other passenger can be taken into account in generating a playlist to be played by the content playback component 114. In this example, the ranking component 112 generates a combined relevancy ranking based on the combined preferences a first and second user in the vehicle. In one example, if a first passenger 504 is the driver's spouse and the second passenger 506 is the driver's son, the driver's playlist will exclude all emails and instant messages based on the preferences of the driver 502, and the playlist generated from all content not excluded will take into account the preferences of each of the driver 502, the first passenger 504 and the second passenger 506. In this example, the ranking component 122 may generate a playlist based solely on news, talk shows or podcasts relating to a particular sport due to the varied preferences of the three passengers. In another example, if only the driver's spouse is in the vehicle as the first passenger 504, the ranking component 122 may generate a playlist that includes news and music in genres that best match the preferences of both the driver 502 and the first passenger 504.

In another example, utilizing the multi-model component 304, the content playback component 114 can generate and respectively play personalized streams of ranked content to a first user and a second user on respective playback devices based up rankings generated by the ranking component 112 with respect to each user. In one example, if a first passenger 504 is the driver's spouse and the second passenger 506 is the driver's son, and the first passenger elects to receive content through an external user device 510, then a playlist can be tailored to the first passenger's preferences by the ranking component 112, and the first passenger 504 can receive that playlist from the content playback component 114 sent to the external user device 510. In this example, any playlist generated ranking component 112 for the driver 502 and the second passenger 506 will not take into account the presence of the first passenger 504 when generating such playlist, and such playlist will be played by the content playback component 114 using the vehicle's content delivery system 508. If the second passenger 504 stops playing or turns off the external user device 510, the content playback component 114 can modify the playlist being played using the vehicle's content delivery system 508 to take into account the presence of the second passenger 504.

Figure 6:
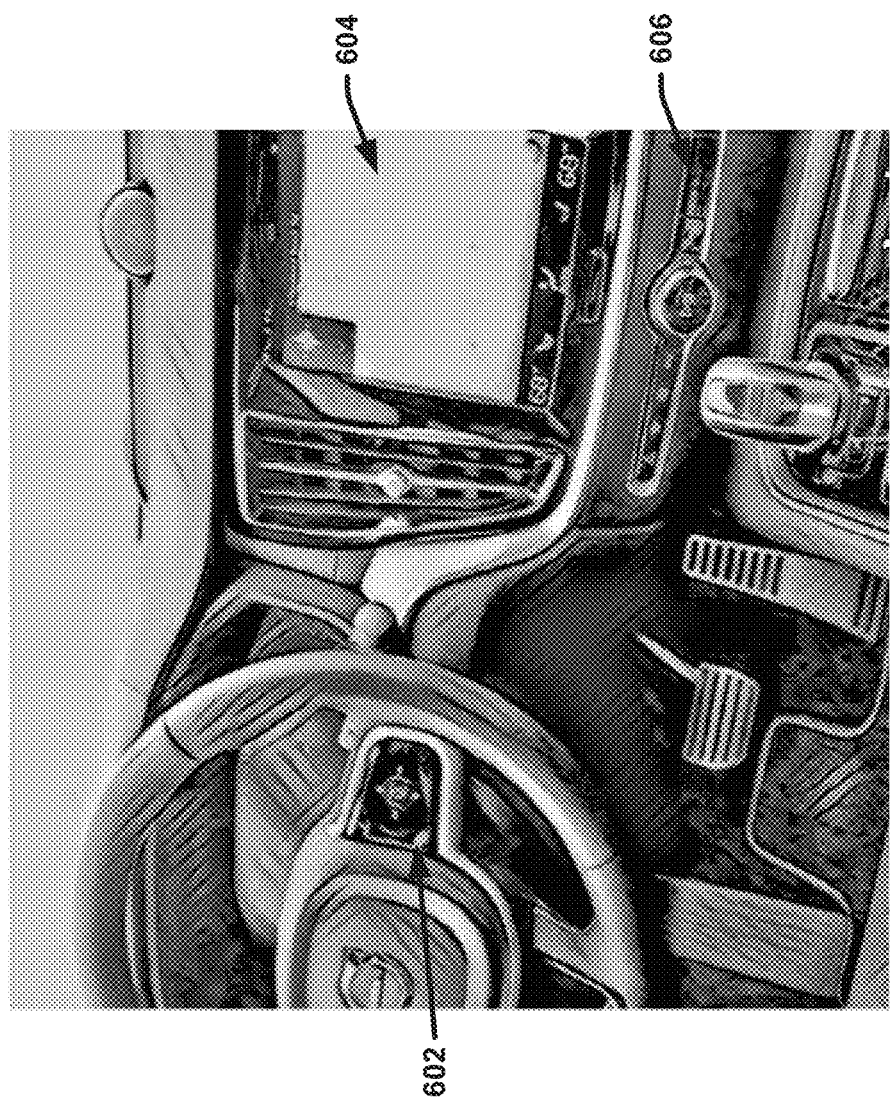
FIG. 6 illustrates yet another example of control component that enables a user to selectively modify preferences with respect to a specific playlist in accordance with one or more embodiments described herein.

FIG. 6 illustrates yet another example of a control component 202 that enables a user to selectively modify preferences with respect to a specific playlist in accordance with one or more embodiments described herein. FIG. 6 depicts a view of the steering wheel and the center stack of the interior dashboard of vehicle with controls available to a user on the steering wheel 602, the vehicle touchscreen 604 that displays a GUI comprising touch controls and additional controls on the center stack 606 to control functions of the vehicle. In one example, a user can use one or more of the controls on the steering wheel 602, the vehicle touchscreen 604 or the center stack 606 to skip one or more content items in a playlist as the playlist is being played or return to previous content items previously played in the playlist.

In another example a user can use voice commands in a vehicle that enables voice controls to skip one or more content items in a playlist as the playlist is being played or return to previous content items previously played in the playlist. In another example, a user can use voice commands in a vehicle that enables voice controls to search a playlist for a specific topic or content type. For example, a user can search for any content in a playlist relating to a game or news event from the previous evening.

Figure 7:
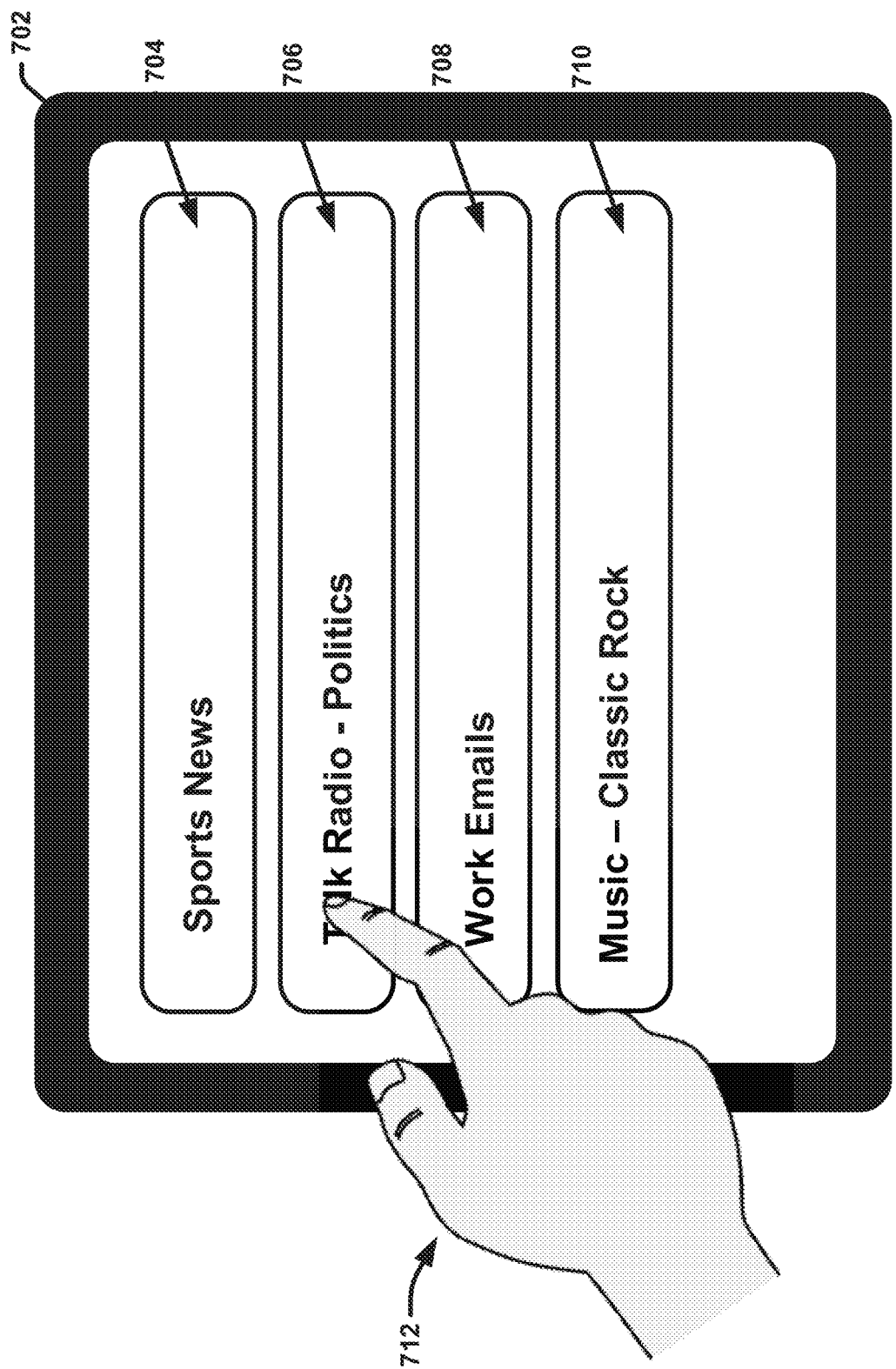
FIG. 7 illustrates yet another example of a visualization component that displays, summarizes and organizes a playlist in accordance with one or more embodiments described herein.

FIG. 7 illustrates yet another example of a visualization component 302 that displays, summarizes and organizes a playlist in accordance with one or more embodiments described herein. FIG. 7 depicts an example of a visualization component 302 in the form of an enlarged view of an example GUI displayed on a vehicle touchscreen that can reside in the center stack of the dashboard of a vehicle. In this example, the touchscreen displays the upcoming items of a playlist generated by the ranking component 112. The items are displayed by topic, with the first item being "Sports News" 704, the next item being "Talk Radio—Politics" 706, the next item being "Work Emails" 708, and the last item being "Music—Classic Rock" 710. This enables a user to see upcoming items and select an item the user desired to listen to first. In this example the user 712 selects the second item listed 706. In another example, the visualization component 302 can provide a variety of GUI configurations to display the items on a playlist and related metadata to enable user to skip items or select items in a playlist that best match a user's preferences in that moment. For example, some users may want to see content items in a playlist displayed by topic as shown in FIG. 7, while other users may prefer more detailed information regarding the content items such as specific participants and content titles. In another example, a user may want to have all content items in a playlist displayed on a touchscreen with a scrolling function in the GUI that enables the user to browse all items.

In another embodiment, with respect to a playlist personalized and delivered to an external user device for an individual user in a vehicle utilizing the multi-modal component 304, the visualization component 302 can comprise an augmented reality component or virtual reality component to display playlist information for such user and enable the user to make playlist decisions such as skipping or selection content items. In one example, a user using an augmented reality headset for better visualization of peripheral and rear views while driving can have playlist information visualized using the augmented reality headset in a manner that doesn't interfere with driving functions. In another example, a passenger listening to a personalized playlist while wearing an augmented reality or virtual reality headset to learn about or better enjoy the surroundings during a drive can have playlist information visualized using the augmented reality or virtual reality headset.

Figure 8:
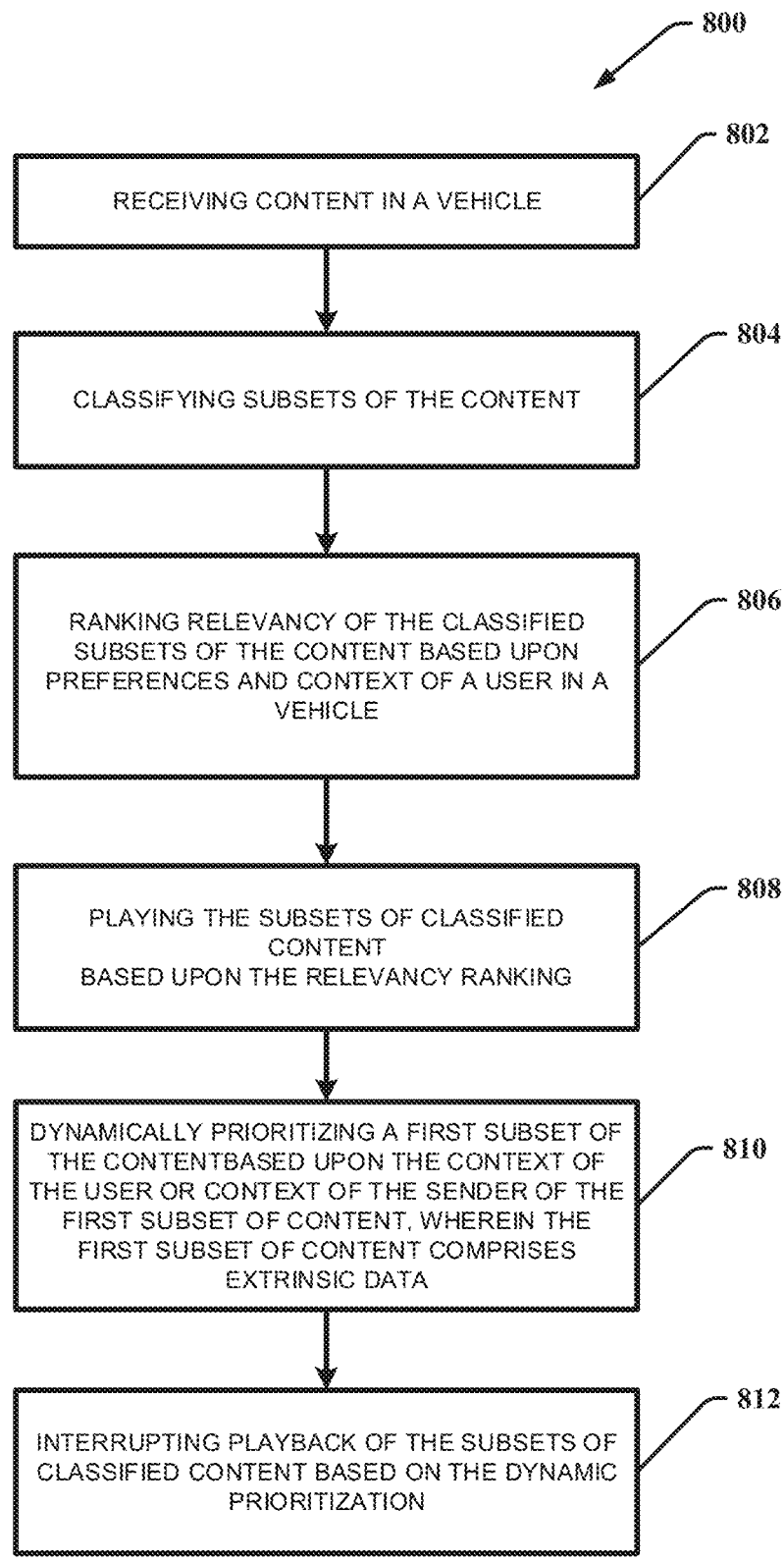
FIG. 8 illustrates a flow diagram of an example of a method to facilitate dynamic playlist priority in a vehicle in accordance with one or more embodiments described herein.

FIG. 8 illustrates a flow diagram of an example of a method to facilitate dynamic playlist priority in a vehicle in accordance with one or more embodiments described herein. Act 802 represents a first act which includes receiving content in a vehicle. At 804, subsets of the content are classified. At 806, relevancy of the classified subsets of content are ranked based upon preferences and context of a user in the vehicle. At 808, the subsets of classified content are played based upon the relevancy ranking. At 810, a first subset of the content is dynamically prioritized based upon the context of the user or context of a sender of the first subset of content, wherein the first subset of content comprises extrinsic data. At 812, playback of the subsets of classified content is interrupted based on the dynamic prioritization.

The one or more embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Various aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing one or more embodiments, but one of ordinary skill in the art can recognize that many further combinations and permutations of these embodiments are possible. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The terminology used herein was chosen to best explain the principles of the embodiments, the practical application or technical improvement over technologies found in the marketplace, or to enable others of ordinary skill in the art to understand the embodiments disclosed herein. In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

What is claimed is:

1. A system, comprising:
a processor that executes computer executable components stored in at least one memory, the computer executable components including:
a compilation component that receives content in a vehicle, wherein the content comprises stored content and streaming content;
an assessment component that respectively classifies subsets of the content;
a ranking component that ranks relevancy of the classified subsets of content based upon preferences and context of a user in the vehicle;
a content playback component that plays the subsets of classified content based upon relevancy ranking;
a prioritization component that dynamically prioritizes a first subset of the content based upon the context of the user or upon context of a sender of the first subset of the content; and
an interrupt component that interrupts play of the subsets of classified content to switch to the streaming content or to another streaming content,
wherein the context of the user includes one or more circumstances of the user, and wherein the context of the sender includes one or more circumstances of the sender.

2. The system of claim 1, further comprising:
a multi-modal component that transfers the play of the subsets of classified content from a first device to a second device.

3. The system of claim 1,
wherein the ranking component ranks relevancy of the classified subsets of content based upon preferences and context of the user and of another user that are in the vehicle concurrently.

4. The system of claim 3,
wherein the content playback component includes a multiplexing component that generates and respectively plays personalized streams of the ranked content to the user and to the another user on separate devices.

5. The system of claim 1, further comprising:
a control component that enables the user to selectively modify the preferences of the user with respect to a playlist of the content.

6. The system of claim 1, further comprising:
an artificial intelligence or machine learning component that learns behavior of the user with respect to the play of the subsets of classified content, and that updates the relevancy ranking of the classified content based upon the learned user behavior.

7. The system of claim 1, further comprising:
a visualization component that displays, summarizes and organizes a playlist wherein the visualization component comprises an augmented reality component that generates an augmented reality environment or a virtual reality component that generates a virtual reality environment.

8. The system of claim 3,
wherein the content playback component plays a subset of the classified content based upon a combined relevancy ranking of the user and of the another user.

9. The system of claim 1,
wherein the interrupt component interrupts play of the subsets of classified content absent the user or any other user in the vehicle directly facilitating the interruption during the play.

10. The system of claim 1,
wherein the interrupt component interrupts playback of the subsets of classified content based on the dynamic prioritization or on another dynamic prioritization of the content or of the another streaming content.

11. The system of claim 10,
wherein the streaming content or the another streaming content switched to has been dynamically prioritized by the prioritization component during the play.

12. A computer-implemented method, comprising:
receiving, by a system operatively coupled to a processor, content in a vehicle, wherein the content comprises stored content and streaming content;
classifying, by the system, subsets of the content;
ranking, by the system, relevancy of the classified subsets of content based upon preferences and context of a user in the vehicle;
playing, by the system, the subsets of classified content based upon the relevancy ranking;

dynamically prioritizing, by the system, a first subset of the content based upon the context of the user or upon context of a sender of the first subset of the content; and interrupting, by the system, play of the subsets of classified content to switch to another streaming content, wherein the another streaming content switched to has been dynamically prioritized based upon the context of the user or upon context of a sender of the another streaming content during the play.

13. The method of claim 12, further comprising:

transferring, by the system, the play of the subsets of classified content from a first device to a second device.

14. The method of claim 12, further comprising:

ranking, by the system, relevancy of the classified subsets of content based upon preferences and context of the user and of another user that are in the vehicle concurrently.

15. The method of claim 14, further comprising:

generating and respectively playing, by the system, personalized streams of ranked content to the user and to the another user on separate devices.

16. The method of claim 12, further comprising:

using, by the system, an artificial intelligence or machine learning component to learn behavior of the user with respect to the play of the subsets of classified content, and updating, by the system, the relevancy ranking of the subsets of classified content based upon the learned user behavior.

17. The method of claim 12, further comprising:

visually displaying, summarizing and organizing, by the system, a playlist; and presenting, by the system, the playlist in an augmented reality or virtual reality environment.

18. The method of claim 14, further comprising:

playing, by the system, a subset of the classified content based upon a combined relevancy ranking of the user and of the another user.

19. The method of claim 12, wherein the context of the user includes one or more circumstances of the user, and wherein the context of the sender includes one or more circumstances of the sender.

20. A computer program product facilitating a process to play content in a vehicle, the computer program product comprising a computer readable storage medium having program instructions embodied therewith, the program instructions executable by processor to cause the processor to:

receive, by the processor, the content in the vehicle, wherein the content comprises stored content and streaming content;

classify, by the processor, subsets of the content;

rank, by the processor, relevancy of the classified subsets of content based upon preferences and context of a user in the vehicle;

play, by the processor, the subsets of classified content based upon the relevancy ranking;

dynamically prioritize, by the processor, a first subset of the content based upon the context of the user or upon context of a sender of the first subset of the content; and interrupt, by the processor, play of the subsets of classified content based on a dynamic prioritization of another streaming content, to switch to the another streaming content, wherein the another streaming content switched to has been dynamically prioritized based upon the context of the user or upon context of a sender of the another streaming content during the play.

21. The computer program product of claim 20, wherein the program instructions are further executable by the processor to cause the processor to:

at least partially receive, by the processor, the additional streaming content during the play.

* * * * *